United States Patent
Venters et al.

(10) Patent No.: US 6,356,560 B1
(45) Date of Patent: Mar. 12, 2002

(54) ARBITRATION MECHANISM FOR STATISTICALLY MULTIPLEXED FRAME RELAY SWITCHING SYSTEM

(75) Inventors: W. Stuart Venters; Wade S. Schofield, both of Huntsville; Philip David Williams, Madison, all of AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/088,461

(22) Filed: Jun. 1, 1998

Related U.S. Application Data

(60) Provisional application No. 60/048,103, filed on May 30, 1997.

(51) Int. Cl.⁷ .............................................. H04L 12/50
(52) U.S. Cl. ........................ 370/462; 370/461; 370/468
(58) Field of Search ................................ 370/438, 439, 370/468, 462, 461, 447

(56) References Cited

U.S. PATENT DOCUMENTS

| | | | | |
|---|---|---|---|---|
| 5,343,465 A | * | 8/1994 | Khalil | 370/232 |
| 5,490,141 A | * | 2/1996 | Lai et al. | 370/60.1 |
| 5,526,344 A | * | 6/1996 | Diaz et al. | 370/364 |
| 5,805,595 A | | 9/1998 | Sharpe et al. | 370/442 |

* cited by examiner

Primary Examiner—Wellington Chin
Assistant Examiner—Brenda H. Pham
(74) Attorney, Agent, or Firm—Allen, Dyer, Doppelt, Milbrath & Gilchrist, P.A.

(57) ABSTRACT

An arbitration mechanism is distributed among channel units of a statistically multiplexed frame relay switching system serving a plurality of access lines, the cumulative bandwidth of which exceeds that of an aggregate data link over which data is to be transported. For each access line, an arbitration code is generated. This code includes a transmit request or start bit, a calculated multibit arbitration value based upon a combination of parameters, including queuing delay and the configuration and traffic rate of the line, and an address code that identifies the physical location of the respective channel unit. All arbitration codes are readable by each frame relay channel unit via a wire-ORed bus. A channel unit participating in an arbitration cycle compares the value of its arbitration code with those of the other participants. That channel unit whose arbitration code is uniquely the largest of all arbitration participants takes ownership of the aggregate data link, transmits data, and then releases the link.

20 Claims, 4 Drawing Sheets

ARBITRATION MECHANISM FOR STATISTICALLY MULTIPLEXED FRAME RELAY SWITCHING SYSTEM

CROSS-REFERENCE TO RELATED APPLICATION

The present application claims the benefit of U.S. Provisional Patent Application Ser. No. 60/048,103, filed May 30, 1997, the disclosure of which is incorporated herein.

FIELD OF THE INVENTION

The present invention relates to digital data communication systems, and is particularly directed to a new and improved arbitration mechanism for a statistically multiplexed frame relay switching system, which is effective to optimize allocation of a limited bandwidth aggregate data link among access lines that are coupled to respective ports of the frame relay switching system.

BACKGROUND OF THE INVENTION

Frame relay (FR) switching systems currently enjoy widespread success for supplying digital data services—principally in support of local area network (LAN) integration across wide area facilities. Frame relay derives its benefit by multiplexing 'frames' of data, or packetized data traffic, from each of a plurality of physical circuits into a common or shared backbone network, so as to reduce overall transport requirements, by creating more efficient use of the available transport bandwidth.

Prior to the advent of frame relay switching systems, LAN integration required the purchase of point-to-point digital data services delivered via individual physical circuits. Among the advantages frame relay provides over point-to-point services are enhanced network reliability and troubleshooting, through redundant and highly manageable switching networks, multiple end-to-end connections via permanent virtual circuits (PVCs) over single physical interfaces, and lower deployment costs that often result in lower consumer fees.

Unfortunately, due to the sporadic nature of data, the efficient utilization of the available bandwidth of such physical interfaces is relatively low, considering the ratio of data transport time (during which the communication circuits are actually sending data over the network) to non-data or idle time (when the circuits are 'waiting' for an instruction initiated by the end user). This relatively low efficient utilization is due principally to a common attribute that is shared by a significant number of typical data networking applications (such as e-mail, web-browsing, terminal input, automatic teller machines, and credit card verification devices); much of the data traffic they generate is in response to some human intervention.

As a non-limiting example, when using a web browser, an end customer may download a magazine article from a web site; the user will then probably spend some period of time reading or at least skimming the article, before 'surfing' for something else. During the time interval that the user is reading the article, the available bandwidth of the data connection is essentially wasted, since no data is being transmitted. While this low utilization efficiency may not be significant in terms of a single dial-up customer, when multiplied by thousands of users, it results in a large number of bandwidth resources being utilized at far less than capacity. This low utilization of available bandwidth results from the necessity of back-hauling services from the communication service supplier (e.g., an internet service provider (ISP)) to the switching backbone.

In a typical implementation, rather than being dispersed throughout the network, the switching backbone is confined to a very limited geographic area, requiring significant back-haul support. In addition, in stark contrast to the widespread availability of central office voice switches, the number of available data switches is relatively small. Also, due to the nature of physical interface design, a frame relay switch is often not necessarily employed in a manner that makes full use of its frame processing functionality. By accessing the frame relay switch through point-to-point facilities, both data transport time and idle time are presented to the switch interface. The frame relay switch then becomes limited at the point of its physical port access, often mandating the purchase and installation of additional frame relay switches and line cards.

In order to better utilize frame relay switch capability, as well as increase the utilization of back-haul transport bandwidth, it is desirable to efficiently extend frame multiplexing to central offices, remote terminals (RTs) and customer premises equipment (CPE) environments in a manner that address current deployment schemes. For this purpose, it has been proposed to implement frame relay switching networks in an architecture of the type diagrammatically shown in FIG. 1.

In this architecture, a plurality of frame relay channel units (frameports) 11 terminate a large number of access lines 13 from associated CPEs 15, and are coupled to an aggregate data link 21 from the network 10. The aggregate data link has a data transport capacity that is considerably less than the cumulative data capacity of all of the access lines 13. Integrated into this architecture is a transport access mechanism that statistically multiplexes data from the various CPEs 15 into a single data stream for transport over the aggregate data link 21. The use of statistically multiplexing serves to reduce the back-hauling of circuits to the data switch, thereby more efficiently utilizing aggregate data transport resources, since the data is multiplexed at the point of access (the respective frame relay channel units 11), rather than at the switch.

In order to provide an orderly and efficient allocation of the limited bandwidth of the aggregate link 21 to each access line 13 requesting service, yet without allowing any individual access line to tie up the aggregate data link during periods of inactivity or congestion, the statistical multiplexing of data from the access lines to the aggregate data link is based upon a prescribed opportunity-to-transmit arbitration mechanism, that is distributed among all users of the system, so that the state of the system is effectively shared with each access line.

For this purpose, each frame relay channel unit 11 is coupled to a common (wire-ORed) arbitration link 12, that allows each channel unit to simultaneously share arbitration information, through which 'ownership' of the aggregate data link 21 is allocated in accordance with a specified 'right to transmit' rule set.

SUMMARY OF THE INVENTION

In accordance with the present invention, there is provided a new and improved arbitration mechanism for controlling the manner in which data from a plurality of access lines, the cumulative bandwidth of which far exceeds that of the aggregate data link, is statistically multiplexed through a frame relay switching system of the type described above, by calculating for each data line an arbitration value based upon a combination of parameters, including queuing delay and information customized for the particular configuration and traffic rate of that line.

As will be described, the arbitration mechanism of the present invention enables user devices to readily interface with each other, in order to determine which device should have access to the aggregate data link, regardless of the degree of traffic congestion. The arbitration mechanism of the invention is able to accommodate periods of aggregate link congestion in a fair, orderly and predictable manner, that ensures that the oldest data packet awaiting transmission will not be excluded from gaining access to the aggregate data link to the benefit of initially higher priority class of service lines.

For this purpose, the control processor of each frame relay channel unit executes a statistical multiplexing arbitration routine, which calculates a respective arbitration value that forms part of the contents of a composite arbitration code presented to and readable by each frame relay channel unit, via a common physical medium (wire-ORed arbitration bus) during a respective arbitration cycle. The use of a common physical arbitration medium allows each participating channel unit to simultaneously share its arbitration code with all other channel units. Since arbitration cycles will occur: at a rate that is directly proportional to the flow of data into the network, they are not periodic and are asynchronous to other system events.

The channel units operate in a 'pseudo-synchronous' mode, performing sample and shift operations on their respectively generated arbitration values, one bit at a time, using a common clock, such as that used for the aggregate data stream. The wire-ORed arbitration bus is electrically configured such that a first logical state (e.g., '1'), associated with an idle condition, corresponds to a high impedance state, and is pulled high by a pull-up resistor. The arbitration bit is driven low (e.g., logical '0') to a prescribed voltage level (e.g., zero volts), when a channel unit requests an arbitration cycle.

The format of the composite arbitration code includes a start bit, a (quasi unique) multibit calculated arbitration value code, and an address code that identifies the actual physical location of the respective channel unit. By quasi unique is meant that the contents of the calculated arbitration value code should, but may not necessarily, be unique for each channel unit. Uniqueness is due to the fact that the arbitration value code is calculated on the basis of a plurality of parameters that have a high probability of being different for each access line. Such parameters include quality of service, committed information rate, and a queuing age parameter that represents the length of time that has elapsed since the line of interest last received service (had ownership of the aggregate data link). As long as a requesting line (having at least one packet to send) is not given ownership of the link, the value of its queuing age will continue to be sequentially incremented.

The calculated arbitration value code is combined with the start bit and the address code to produce a composite arbitration code, which is asserted onto the arbitration bus. Each channel unit compares the sampled state of the start bit portion of the arbitration bus with the value of the start bit contained in the arbitration code that was asserted onto the arbitration bus by that channel unit. If the sampled state of the start bit portion of the bus differs from what was asserted, the channel unit ceases participation in the arbitration cycle and terminates assertion of its composite arbitration value code. However, if the sampled state of the start bit is the same as what it has asserted, the channel unit becomes an active participant in that portion of the arbitration cycle which awards the aggregate link to the highest priority participating line.

As each channel unit's arbitration code is clocked onto the arbitration bus, a respective channel unit will perform a bit by bit comparison, for each bit that it sequentially clocks onto the bus, with the state of the bus as driven by other channel units, to determine whether that channel unit may be given priority to transmit. As bits are sequentially clocked onto the bus, whenever a channel unit sees a difference between its bit value and that on the bus, the channel unit knows it has a lower priority and terminates its participation in the arbitration cycle. As a result, at the end of the arbitration cycle (when all bits of the arbitration code have been clocked onto the arbitration bus), only the channel unit having the largest priority will not have dropped out, allowing it to take ownership of the aggregate data link. That channel unit then transmits its packet, and releases ownership of the link for reassignment at the next arbitration cycle.

DETAILED DESCRIPTION

Figure 1:
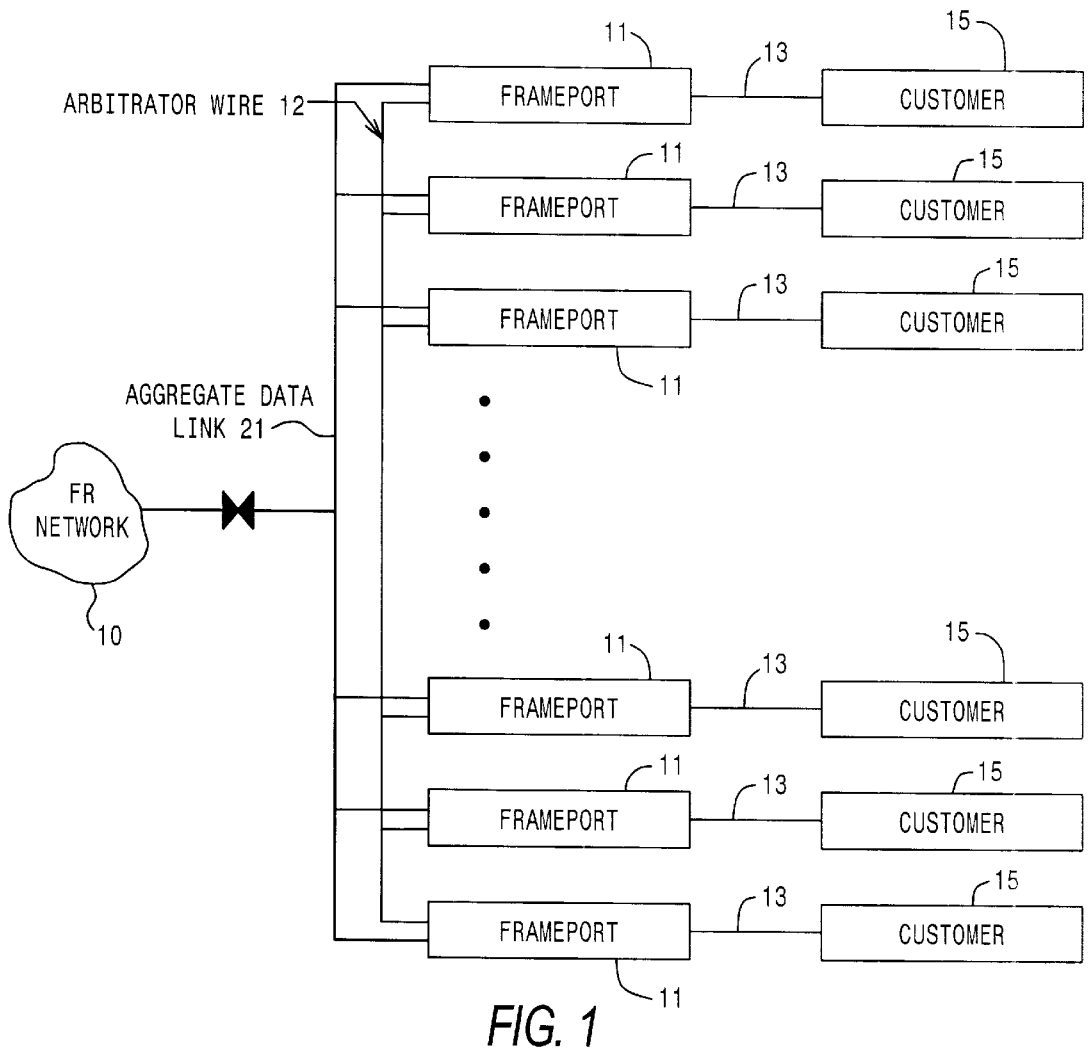
FIG. 1 diagrammatically illustrates the general architecture of a statistically multiplexed frame relay switching system employing a distributed arbitration mechanism.

Before describing in detail the distributed frame relay arbitration mechanism of the present invention, it is to be understood that the invention primarily resides in a prescribed arrangement of conventional communication circuits and associated digital signal processing components and an attendant supervisory control program therefor, that controls the operations of such circuits and components. Consequently, the configuration of such circuits and components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustration and associated flow charts are primarily intended to show the major components of a statistically multiplexed frame relay system in a convenient functional grouping and processing sequence, whereby the present invention may be more readily understood.

As pointed out above, optimizing allocation of the available bandwidth of the aggregate data link among all of the access lines served by the frame relay switching system involves a number of considerations. The arbitration mechanism should not prevent any individual access line from burdening the aggregate bandwidth during periods of inactivity (of that line), and must allow for efficient transition of 'ownership' of the aggregate bandwidth between access lines. Otherwise packet collisions between access lines could occur, resulting in a loss of data. Moreover, during periods of congestion, one or more access lines cannot be allowed to completely utilize or 'tie up' the aggregate bandwidth at the expense of other access lines.

In addition to taking into account these factors, the present invention provides for (customized) class-of-service defined attributes to give preferential treatment to some access lines, so that 'tiers' of service can be established and tariffed as such. As non-limiting examples, such tiers of service may be used to distinguish between respectively differently tariffed data rates, or between a residential internet access account and a more expensive corporate wide area network access account.

To this end, pursuant to the invention, in the architecture of a frame relay switching system of the type diagrammatically illustrated in FIG. 1, the communication control software that is resident and executed in the control processor of each channel unit 11 is operative to calculate a respective arbitration value based upon a combination of parameters, including queuing delay and information customized for the configuration and traffic pattern of its associated line, as will be described below with reference to FIGS. 2–5.

Figure 2:
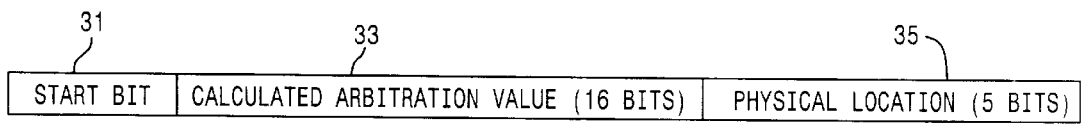
FIG. 2 shows the format of an arbitration code employed by the present invention.

This calculated arbitration value forms part of the contents of a composite arbitration code that is presented to and readable by each frame relay channel unit 11, during the sequentially clocking of the bits of the arbitration code onto the shared arbitration bus 12, during a respective arbitration cycle. The format of an arbitration code in accordance with the invention is shown in FIG. 2 as comprising a start code 31 (here a single bit, although more than one bit may be used), a multibit (e.g., sixteen bit) calculated arbitration value code 33, and an address code 35, which identifies the physical (backbone) location of the respective channel unit.

As stated above, the use of a common physical medium for the arbitration bus allows the participating channel units to simultaneously share their respective arbitration codes with one another. Arbitration cycles will occur at a rate directly proportional to the flow of data into the network, so that arbitration cycles are not periodic and are therefore considered to be asynchronous to other system events. Since the channel units 11 operate in a 'pseudo-synchronous' mode, they must sample and shift the bits of their respectively generated arbitration values using a common clock. For this purpose, the clock for the aggregate data stream transported on link 21 (e.g., a 1.544 MHz kHz clock derived from backplane timing) is preferably employed. Wire-ORing of the arbitration bus 12 is implemented using a dynamic pull-up resistor, in which bit times are twice the period of the aggregate clock frequency, with the first half of a bit time used to pre-charge the bus.

The arbitration bus 12 is electrically configured such that a first logical state (e.g., '1') corresponds to a high impedance state of the bus, which is pulled high by the pull-up resistor. A second logical state (e.g., '0') is associated with a prescribed line voltage (e.g., 0 volts). The wire-ORed arbitration line is driven to that state by any channel unit requesting participation in an arbitration cycle. Thus, if both logical states ('1'and '0') are asserted by different channel units, the value on the arbitration bus will be that logical state (e.g., logical '0') associated with a true line voltage (e.g., 0 volts). This allows each channel unit to readily compare each bit of the arbitration code that it sequentially clocks onto the bus with the bits of the arbitration codes clocked onto the bus by other channel units, and thereby determine whether that channel unit may be given priority to transmit (ownership of the aggregate data link).

As will be described below with reference to the flow chart of FIG. 5, the relationship that defines the composition of each channel unit's arbitration code is as follows: Arbitration Value=Offset+Bias+Scale*(FrameLength/CIR—WaitTime). The arithmetic value of the arbitration code is defined such that the higher the priority, the lower the value of the arbitration code. Thus, an arbitration code of '000 ... 000' will have priority over an arbitration code of '010 ... 000'.

Due to the wire-ORed structure of the arbitration bus, above-described, as bits are sequentially clocked onto the bus (most significant bit (MSB) first), whenever a channel unit sees a difference between its bit value ('1') and that ('0') on the bus, the channel unit knows it has a lower priority and terminates its participation in the arbitration cycle. As a consequence, at the end of the arbitration cycle (the clocking out of all bits of the arbitration code onto the arbitration bus), only the channel unit having the largest priority will not have dropped out, allowing it to take ownership of the aggregate data link.

Figure 3:
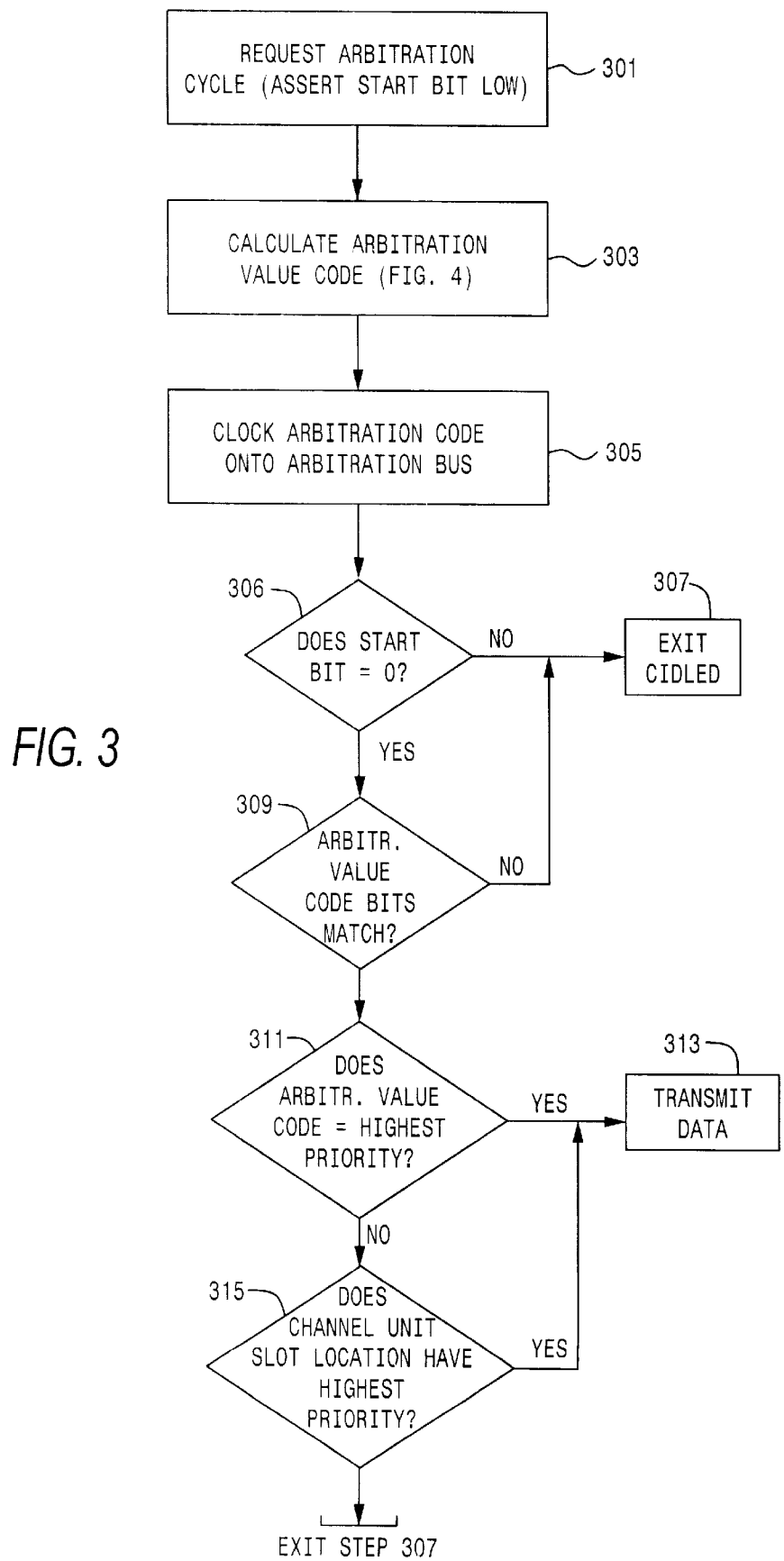
FIG. 3 shows the steps of an arbitration cycle flow diagram in accordance with the present invention.

The arbitration cycle functionality that is performed by the calculation and assembly of an arbitration code by a respective channel unit, and the comparison of the successive bits of that arbitration code, as they are clocked onto the arbitration bus, with the bits of the arbitration codes asserted by other channel units may be represented by the arbitration cycle flow diagram of FIG. 3. In order to initiate an arbitration cycle (e.g., in response to a customer CPE-initiated request), in step 301, the control processor within any channel unit requesting access to the aggregate link changes the state of the start bit from a first logical value (e.g., '1')—which corresponds to an idle or 'nothing to send' state—to a second logical value (e.g., '0')—corresponding to a request to transmit state). Namely, as described above, asserting the start bit low (logical '0') serves to notify every other channel unit that an arbitration cycle is to be conducted.

In response to any start bit being asserted low in step 301, then in step 303, each channel unit will proceed to calculate its own arbitration value code (using the parameter set described below with reference to the arbitration value calculation subroutine of FIG. 4), incorporate that value into the composite arbitration code clocked onto the arbitration bus 12, and monitor the result. As described above, the contents of the multibit calculated arbitration value code are 'quasi' unique for each channel unit.

Figure 4:
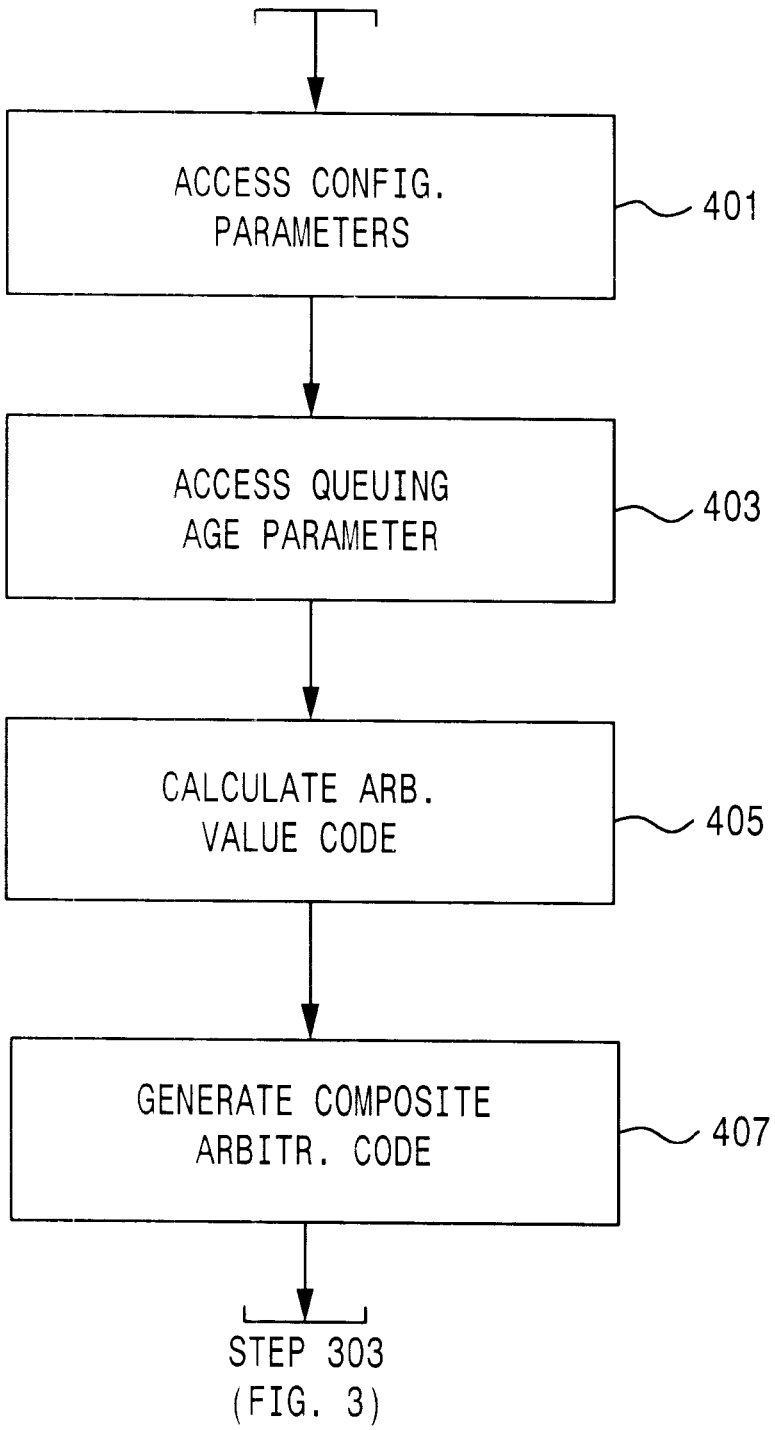
FIG. 4 shows the steps of an arbitration value calculation subroutine employed in the arbitration cycle flow diagram of FIG. 3.

For this purpose, as shown in the arbitration value calculation subroutine FIG. 4, in step 401, two line configuration parameters: 1) quality of service (QOS), and 2) committed information rate (CIR) associated with the average throughput of purchased data rate, that have been previously assigned to each line, are accessed from memory. These parameters are configured on a per circuit basis and are used to assign priority to each of the access lines relative to the other access lines, with a higher valued parameter having priority over a lower valued parameter.

A third parameter, which is accessed in step 403, is representative of the effective queuing age of a packet awaiting transmission in a given line. Specifically, this queuing age parameter represents the amount of time that has elapsed, since the circuit of interest last received service (had ownership of the aggregate data link 21). As long as a requesting line (having at least one packet to send) is not given ownership of the link, the value of its queuing age will continue to be sequentially incremented with the passage of time.

Figure 5:
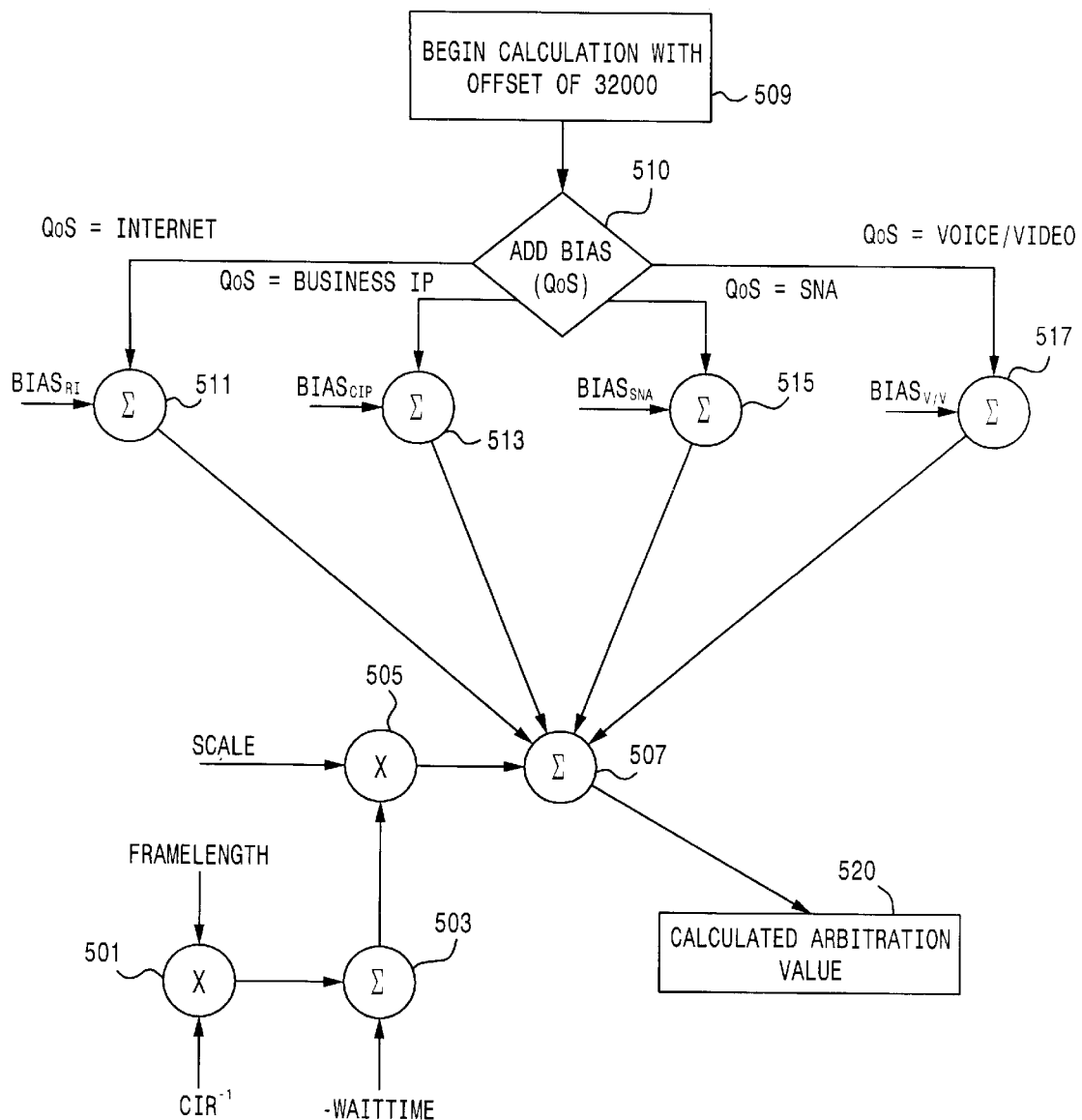
FIG. 5 is a flow chart of the priority relationship employed in the arbitration value calculation subroutine of FIG. 4.

In step 405, using the priority relationship shown in FIG. 5, the queuing age parameter generated in step 403 is combined with the configuration parameters supplied in step 401, to calculate the arbitration value code 33. As can be seen from this relationship, regardless of the values of the two line configuration parameters accessed from memory in step 401, with the passage of time the queuing age parameter of the oldest awaiting circuit can be expected to eventually reach a value that will cause its calculate arbitration value code 33 to have the largest value among all participants of an arbitration cycle, and ostensibly cause ownership of the aggregate link to be awarded to that circuit. In step 407, the calculated arbitration value code 33 is combined with the start bit 31 and the address code 35 to produce the composite arbitration code of FIG. 2, and clocked onto the arbitration link 12 in step 303, described above.

Next, in query step 305, the bits of its assembled arbitration code are clocked onto the arbitration bus. In query step 306, each channel unit compares the sampled state of the start bit portion of its arbitration code with the value of the start bit contained in the arbitration code that was asserted onto the arbitration bus by that channel unit in step 303. If the sampled state of the start bit portion of the bus is different from what was asserted by that channel unit (the answer to step 306 is NO), it is inferred that the channel unit is in an idle state, and the routine transitions to termination step 307, in which the channel unit ceases participation in the arbitration cycle and terminates assertion of its composite arbitration value code. However, if the state of the start bit read from the arbitration bus is the same as what it has asserted (the answer to step 306 is YES), the routine transitions to step 309, in which the channel unit becomes an active participant in the remaining portion of the arbitration cycle which awards the aggregate link to the highest priority participating line.

In particular, in query step 309, each channel unit that is participating in the current arbitration cycle (namely, for which the answer to step 306 was YES) compares the successive bits of its arbitration code with those of the other participants, as they are clocked onto the arbitration bus. If, at some point during the clocking out of the bits (sixteen in the present example) of the calculated arbitration value code 33 onto the bus, the state of the arbitration bus differs from that of the sampling channel unit, that channel unit infers that its arbitration code is not the largest valued code and drops out of the arbitration cycle. This action is represented by a NO answer to query step 309, so that the channel unit exits the cycle and is denied ownership of the aggregate data link. It must await the opportunity to transmit a packet at the next arbitration cycle.

If the arbitration value code of the channel unit of interest is the largest, then at the conclusion of clocking out all of the bits (sixteen in the present example) of the calculated arbitration value code 33 onto the bus, all other channel units will have dropped out of the arbitration cycle, so that whatever bits are being asserted onto the bus are sourced exclusively from only that one channel unit. In this case, the answer to query step 309 is YES, and the routine transitions to step 311, to determine whether any other channel unit remains as a participant in the arbitration cycle.

As pointed out above, the multibit calculated arbitration value code is quasi unique in that its contents should, but may not necessarily, be different for each channel unit, since its arbitration value code is calculated on the basis of a plurality of parameters that have a high probability of being different for each access line. However, there is a possibility, albeit a very remote one, that the calculated arbitration value codes 33 for more than one channel unit are the same. To accommodate this possibility, in query step 311, the routine determines whether there are any other channel units remaining as arbitration cycle participants (namely, whether any other participant has this same 'largest value' arbitration value code 33).

In step 311, if the arbitration code of the channel unit of interest is uniquely the largest (has highest priority), then at the conclusion of clocking out all of the bits (sixteen in the present example) of the calculated arbitration value code 33 onto the bus, all other channel units will have dropped out of the arbitration cycle, so that whatever bits are being asserted onto the bus are sourced exclusively from only that one channel unit. In this case, the answer to query step 311 is YES, and the routine transitions to step 313, in which that channel unit takes ownership of the aggregate data link 21, transmits its packet, and releases ownership of the link for reassignment at the next arbitration cycle. The arbitration cycle is now complete.

However, if the arbitration code of the channel unit of interest is not uniquely the largest, then at the conclusion of clocking out all of the bits of the calculated arbitration value code 33 onto the bus, not all other channel units will have dropped out of the arbitration cycle. In this case, the answer to step 311 is NO, and it is inferred that at least one other channel unit requesting service has calculated the same value for its arbitration value code 33, requiring a further level of priority determination.

In this event, the routine transitions to query step 315, wherein the successive bits of the address code 35 associated with the physical address of the access line of interest are compared with those of the competing line(s). If the channel unit of interest completes the clocking out of the address portion 35 of its arbitration code without finding a mismatch with the contents of the arbitration bus, then the answer to step 315 is YES (the physical address of the channel unit of interest has the higher priority physical address). In this case the routine transitions to step 313, in which that channel unit takes ownership of the aggregate data link 21, transmits its packet, and releases ownership of the link for reassignment at the next arbitration cycle. The arbitration cycle is now complete.

However, if the channel unit of interest encounters a mismatch with the contents of the address portion 35 of its arbitration code, then the answer to step 315 is NO (the physical address of the channel unit of interest has a lower priority physical address). In this case, the channel unit is denied ownership of the aggregate data link, and transitions to step 307, wherein it exits the current arbitration cycle, to await the opportunity to transmit a packet at the next arbitration cycle.

Referring now to FIG. 5, the arbitration value is generated as follows. At multiply operator 501, the length of a respective frame, in bits, or FrameLength, is divided by the committed information rate (CIR) of the circuit in bits per second, which yields the number of seconds that should be required to send a frame of data over a circuit having a transport equal to CIR. At subtraction operator 503, the time (in milliseconds) since the circuit last had access to the aggregate data link (WaitTime) is subtracted from the FrameLength/CIR dividend. This operation provides a measure of how heavily the data stream is using its CIR. A positive value indicates a high use frequency and therefore a lower priority. A negative value indicates a low use frequency and therefore a higher priority value.

The resulting difference value is then multiplied at 505 by a Scale value, which corresponds to the network bit rate divided by a prescribed value (e.g., 2048). For example, the Scale value may be set at 750 for a T1 aggegate data link. This scaling operation serves to convert the value to signed, fixed point arithmetic. This scale value is then summed at 507 with a composite set of bias parameters, derived from an initial offset value (e.g., 32000) supplied at 509 and used for a quality of service (QOS) parameter at 510, which allows for preferential treatment, depending on the quality of service for the circuit.

The bias parameters are supplied at 511, 513, 515 and 517 and include: $Bias_{RI}$ (bias for Residential Internet quality of service (e.g., set equal to 0); $Bias_{CIP}$ (bias for Corporate IP quality of service (e.g., set equal to 3800); $Bias_{SNA}$ (bias for Systems Network Architecture quality of service (e.g., set equal to 7600); and $Bias_{V/V}$ (bias for Voice/Video quality of service (e.g., set equal to 11400).

The size of the bias is selected such that preferential circuits running at or below CIR will receive preferential treatment. If a preferential circuit chooses to run over CIR, it may do so, but may lose some arbitrations to less preferential circuits. Adding the offsets supplied at 509 converts the expression to unsigned fixed point format. The summation value obtained at 520 is the calculated arbitration value, respective bits of which are clocked onto the arbitration bus, 12, at step 303, as described above.

As will be appreciated from the foregoing description, by a prescribed combination of control parameters that include quality of service, committed information rate and effective queuing age, the distributed frame relay statistical multiplexing arbitration mechanism of the present invention readily enables user devices to readily interface with each other to determine which device should have access to the aggregate data link, regardless of the degree of data traffic congestion. As a consequence, the invention is able to accommodate periods of aggregate link congestion in a fair, orderly and predictable manner. This ensures that the oldest data packet awaiting transmission will not be excluded from gaining access to the aggregate data link to the benefit of initially higher priority class of service lines.

While we have shown and described an embodiment in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed is:

1. A frame relay switching system comprising:
   a plurality of frame relay channel units coupled to respective access lines for associated user equipments, and being operative to statistically multiplex data from said access lines onto an aggregate data communication link having a limited bandwidth that is less than the cumulative data capacity of said access lines; and
   a common arbitration link coupled to each frame relay channel unit and through which each frame relay channel unit shares arbitration information representative of the right to transmit over said limited bandwidth aggregate data communication link; and wherein
   each frame relay channel unit is operative to execute an arbitration routine for arbitrating the allocation of said limited bandwidth aggregate data communication link among said access lines by performing the steps of:
   i) in response to a request from any of said plurality of access lines to transmit data supplied thereby over said limited bandwidth aggregate data communication link, generating an arbitration code that includes information representative of whether its associated access line has data to be transmitted, and an arbitration value based upon a combination of parameters, including queuing delay of data supplied by said associated access line and information customized for said associated access line,
   ii) coupling said arbitration codes generated in step i) to said common arbitration link, and
   iii) processing arbitration codes coupled to said common arbitration link to determine which channel unit has priority to transmit data over said limited bandwidth aggregate data link, and selectively providing the right to transmit data provided by its associated access line over said limited bandwidth aggregate data link, in response to said arbitration code being representative that said associated access line has transmission priority over all other access lines.

2. A frame relay switching system according to claim 1, wherein step i) comprises generating said arbitration value in accordance with information customized for the configuration and traffic rate of said associated access line.

3. A frame relay switching system according to claim 1, wherein said arbitration code includes address information associated with the physical location of said frame relay channel unit in said frame relay switching system.

4. A frame relay switching system according to claim 1, wherein said accumulated queuing delay is representative of the length of time that has elapsed since said associated access line last had the right to transmit over said limited bandwidth aggregate data communication link.

5. A frame relay switching system according to claim 1, wherein said common arbitration link is electrically wire-ORed, so that a first logical value associated with an idle condition corresponds to a first impedance state, and is driven to a second logical value associated with a request for participation in an arbitration cycle, such that assertion of both said first and second logical values by different channel units causes the logical value on said common arbitration link to be said second logical value, representing that at least one access line has data to transmit.

6. A frame relay switching system according to claim 1, wherein said arbitration code includes a start bit representative of whether its associated access line has data to be transmitted, a multibit arbitration value code derived in accordance with said combination of parameters, and an address code that identifies the physical location of the respective channel unit.

7. A frame relay switching system according to claim 1, wherein said information customized for said associated access line is representative of quality of service and committed information rate for said associated access line.

8. A frame relay switching system according to claim 1, wherein step iii) comprises selectively providing the right to transmit data, supplied by said associated access line, over said limited bandwidth aggregate data link, in response to said arbitration code being uniquely the largest of all arbitration participants.

9. A frame relay switching system according to claim 1, wherein step ii) comprises sequentially clocking respective bits of said arbitration code onto said common arbitration link, and wherein step iii) comprises, in response any bit of said arbitration code differing from the bit state of said common arbitration link, terminating participation in said allocation of said limited bandwidth aggregate data communication link.

10. For use with frame relay switching system having a plurality of frame relay channel units that are coupled to respective access lines for associated user equipments, said frame relay channel units being operative to statistically multiplex data from said access lines onto an aggregate data communication link having a limited bandwidth that is less than the cumulative data capacity of all of said access lines, a method for arbitrating the allocation of said limited bandwidth aggregate data communication link among said access lines comprising the steps of:

(a) coupling each frame relay channel unit to a common arbitration link, through which each frame relay channel unit may simultaneously share arbitration information representative of the right to transmit over said limited bandwidth aggregate data communication link;

(b) in response to a request from any of said plurality of access lines to transmit data supplied thereby over said limited bandwidth aggregate data communication link, generating within each frame relay channel unit an arbitration code that includes information representative of whether its associated access line has data to be transmitted, and an arbitration value based upon a combination of parameters, including accumulated queuing delay and information customized for said associated access line;

(c) coupling arbitration codes generated in step (b) to said common arbitration link; and (d) at each frame channel unit, processing arbitration codes coupled to said common arbitration link to determine which channel unit has priority to transmit data over said limited bandwidth aggregate data link, and selectively providing the right to transmit data provided by its associated access line over said limited bandwidth aggregate data link, in response to said each frame relay channel unit's arbitration code being representative that said associated access line has transmission priority over all other access lines.

11. A method according to claim 10, wherein step (b) comprises generating said arbitration value in accordance with information customized for the configuration and traffic rate of said associated access line.

12. A method according to claim 10, wherein said arbitration code includes address information associated with the physical location of said each frame relay channel unit in said frame relay switching system.

13. A method according to claim 10, wherein said accumulated queuing delay is representative of the length of time that has elapsed since said associated access line last had the right to transmit over said limited bandwidth aggregate data communication link.

14. A method according to claim 10, wherein said common arbitration link is electrically wire-ORed, so that a first logical value associated with an idle condition corresponds to a first impedance state, and is driven to a second logical value associated with a request for participation in an arbitration cycle, such that assertion of both said first and second logical values by different channel units causes the logical value on said common arbitration link to be said second logical value, representing that at least one access line has data to transmit.

15. A method according to claim 10, wherein said arbitration code includes a start bit representative of whether its associated access line has data to be transmitted, a multibit arbitration value code derived in accordance with said combination of parameters, and an address code that identifies the physical location of the respective channel unit.

16. A method according to claim 10, wherein said information customized for said associated access line is representative of quality of service and committed information rate for said associated access line.

17. A method according to claim 10, wherein step (d) comprises selectively providing the right to transmit data, supplied by said associated access line, over said limited bandwidth aggregate data link, in response to said each frame relay channel unit's arbitration code being uniquely the largest of all arbitration participants.

18. A method according to claim 10, wherein step c) comprises sequentially clocking respective bits of said arbitration codes onto said common arbitration link, and step d) comprises, in response any bit of an arbitration code differing from the bit state of said common arbitration link, terminating participation of the channel unit generating the different bit in said allocation of said limited bandwidth aggregate data communication link.

19. For use with frame relay switching system having a plurality of frame relay channel units that are coupled to respective access lines for associated user equipments, said frame relay channel units being operative to statistically multiplex data from said access lines onto an aggregate data communication link having a limited bandwidth that is less than the cumulative data capacity of all of said access lines, a method for arbitrating the allocation of said limited bandwidth aggregate data communication link among said access lines comprising the steps of:

(a) coupling each frame relay channel unit to a common arbitration link, through which each frame relay channel unit may simultaneously share arbitration information representative of the right to transmit over said limited bandwidth aggregate data communication link;

(b) in response to a request from any of said plurality of access lines to transmit data supplied thereby over said limited bandwidth aggregate data communication link, generating within each frame relay channel unit an arbitration code that includes information representative of whether its associated access line has data to be transmitted, and an arbitration value based upon a combination of parameters, including accumulated queuing delay and information customized for said associated access line; and (c) sequentially clocking respective bits of said arbitration codes onto said common arbitration link, and selectively providing the right to transmit over said limited bandwidth aggregate data link to that frame relay channel unit whose arbitration code bit states match the states of said common arbitration link throughout the sequential clocking of that frame relay channel unit onto said common arbitration link.

20. A method according to claim 19, wherein step (c) comprises, in response to any bit of an arbitration code differing from the bit state of said common arbitration link, terminating participation of the channel unit generating the different bit in said allocation of said limited bandwidth aggregate data communication link.

* * * * *